United States Patent [19]

Slangen

[11] Patent Number: 5,411,747
[45] Date of Patent: May 2, 1995

[54] PROCESS FOR THE TREATMENT OF ASPARTAME

[75] Inventor: Hubertus J. M. Slangen, Stein, Netherlands

[73] Assignee: Holland Sweetner Company V.o.F., Maastricht, Netherlands

[21] Appl. No.: 74,446

[22] Filed: Jun. 10, 1993

[30] Foreign Application Priority Data

Jun. 11, 1992 [NL] Netherlands ............... 9201029

[51] Int. Cl.$^6$ ................................ A61K 9/14
[52] U.S. Cl. .................... 424/489; 426/479; 426/443
[58] Field of Search .............. 562/450; 560/40, 41; 127/34; 424/489, 490, 494; 426/479, 443, 316

[56] References Cited

U.S. PATENT DOCUMENTS

| | | | |
|---|---|---|---|
| 4,477,481 | 10/1984 | Eisenhardt, Jr. | 426/590 |
| 4,486,455 | 12/1984 | Wolf et al. | 426/548 |
| 4,517,214 | 5/1985 | Shoaf et al. | 426/548 |
| 4,588,612 | 5/1986 | Perkins et al. | 427/213 |
| 4,889,709 | 12/1989 | Mackles et al. | 424/4 S |
| 5,114,726 | 5/1992 | Tsau et al. | 426/289 |
| 5,162,128 | 11/1992 | Mills et al. | 426/599 |

FOREIGN PATENT DOCUMENTS

| | | |
|---|---|---|
| 229730 | 7/1987 | European Pat. Off. . |
| WO8900819 | 2/1989 | WIPO . |

OTHER PUBLICATIONS

Perry's Chemical Handbook; Section 8–7.

Primary Examiner—José G. Dees
Assistant Examiner—Samuel Barts
Attorney, Agent, or Firm—Cushman Darby & Cushman

[57] ABSTRACT

The invention relates to a process for the treatment of dried aspartame characterised in that, in a first separation step, particles smaller than 50 μm are removed, with the aid of a stream of air, from aspartame having a particle size distribution with which more than 5 wt. % of the aspartame has a particle size of less than 20 μm and more than 10 wt. % of the aspartame has a particle size of more than 400 μm, and that in a second separation step the product resulting from the first step is subjected to a screening step using a screen that separates at a value between 150 and 250 μm, after which the fraction of the smaller particles thus obtained is recovered as a first product and the fraction of the larger particles is recovered as a second product or is optionally subjected to a further separation step using a screen that separates at a value between 400 and 1000 μm, the fraction of smaller particles thus obtained being recovered as the second product.

Aspartame having a particle size distribution with which 97% of the particles is larger than 20 μm and 97% of the particles is smaller than 250 μm appears to present exceptionally good properties as regards processability and dissolution rate.

4 Claims, No Drawings

PROCESS FOR THE TREATMENT OF ASPARTAME

The invention relates to a process for the treatment of dried aspartame, and to aspartame thus recovered.

Aspartame is a sweetener that is often used in low-calorie lemonades, sugar-free chewing gum and low-calorie sweeteners. Aspartame is often sold as a 'powder' consisting of particles smaller than 1 mm. This powder usually has a wide particle size distribution: there is a significant fraction of particles with sizes between 0 and 20 $\mu$m, 20–50 $\mu$m, etc. This type of product appears to be (1) relatively poorly soluble, (2) electrostatically chargeable, (3) non-free-flowing, (4) the cause of dust problems, (5) difficult to dose and (6) poorly dispersible in water.

In order to prevent some of these problems aspartame is sometimes sold of which 90 wt. % of the particles are between, say, 250 and 750 $\mu$m. This aspartame, however, has a relatively low dissolution rate. In addition, it presents the drawback that a special treatment, for example a granulation step, is required afterwards to process undesired material (aspartame with particle sizes outside this range).

The invention provides a process for the treatment of dried aspartame with which product of a very high quality and good dissolution rate is obtained and with which only very little material need be reprocessed.

The process for the treatment of dried aspartame is characterised in that, in a first separation step, particles smaller than 50 $\mu$m are removed for the most part, with the aid of a stream of air, from aspartame having a particle size distribution with which more than 5 wt. % of the aspartame has a particle size of less than 20 $\mu$m and more than 10 wt. % of the aspartame has a particle size of more than 400 $\mu$m and, in a second separation step, the product resulting from the first step is subjected to a screening step using a screen that separates at a value between 150 and 250 $\mu$m, after which the fraction of the smaller particles thus obtained is recovered as a first product and the fraction of the larger particles is recovered as the second product or is optionally subjected to a further separation step using a screen that separates at a value between 400 and 1000 $\mu$m, the fraction of smaller particles thus obtained being recovered as second product.

In the first step, particles smaller than 40 $\mu$m, in particular smaller than 30 $\mu$m, more in particular particles smaller than 20 $\mu$m, are preferably separated (hereinafter to be referred to as very fine aspartame), the fractions of particles larger than 40 $\mu$m, larger than 30 $\mu$m and larger than 20 $\mu$m, respectively, being the product resulting from the first step.

The very fine aspartame is preferably returned to the process. This aspartame may for example be dissolved and recrystallised. It is also possible, and preferable, to mix this aspartame with aspartame slurry from a crystalliser or centrifuge for a granulation and drying step.

A classifier and a stream of air are used to separate this very fine aspartame. As a rule more than 1 kg of air per kg of aspartame is used as the stream of air. Preferably, use is made of between 2 and 50 kg of air, in particular of between 5 and 20 kg per kg of aspartame. Very suitable is for example a 'Sweco Turbo-Screen' (hereinafter also to be referred to as TS) manufactured by Sweco. It is not possible to effect good separation in practice using an ordinary screen, without an additional driving force of a stream of air.

In addition, the classifier medium (usually a very fine screen or a plate with very small holes) is preferably continuously cleaned. This can be done for example by vibrating the screen or plate or by countercurrently blowing air through the screen or plate in places.

In order to separate very fine aspartame also the use of a fluidized bed is very suitable. As a rule the rate of fluidization will be chosen between 5 and 25 cm/sec. The thickness of the layer in the fluid bed may vary within a wide range without affecting the separation essentially.

For the process according to the invention it appears to be very important to separate very fine aspartame in a first separation step. This ensures that the next separation step, using a screen that separates at 150–250 $\mu$m, takes place without problems in a very efficient manner. Because when a screening step at for example 200 $\mu$m was carried out as the first separation step, the screening apparatus became fouled/blocked and it proved difficult to dose the aspartame.

The product resulting from the first separation step is subjected to a second separation step using a screen that separates at a value between 150 and 250 $\mu$m. Preferably, the screen separates a value between 170 and 220 $\mu$m, in particular at a value between 180 and 205 $\mu$m.

The fraction of the larger particles resulting from the second separation step is either directly recovered as a second product or it is subjected to a further separation step to remove relatively coarse material. Use can be made of a screen that separates at a value between 400 and 1000 $\mu$m, depending on the desired application of the aspartame product. If only the coarsest material is to be removed a screen that separates at a value between 900 and 1000 $\mu$m is very suitable. Such a screening step may optionally also take place before the second separation step, but that is not preferable because then all of the aspartame (with the exception of the very fine aspartame) is subjected to this screening step, which means that a relatively large screen is required, which is less attractive from an economic point of view.

The separated coarse material can be ground and returned to the beginning of the treatment section for the use of the process according to the invention.

In this manner several fractions of aspartame are obtained, the fraction recovered as the first product in particular having very good properties. In particular the combination of a high dissolution rate, good flow properties (free flowing), good dispersibility, little dust formation and the virtual absence of electrostatic charging is unique. In addition, this aspartame appears to be extremely suitable for use in tablets, powders and chewing gum in particular, because the absence of larger particles means that a good distribution of aspartame throughout the product is obtained.

The first product is characterised by a narrow particle size distribution with which 97 wt. % of the particles is larger than 20 $\mu$m, preferably larger than 30 $\mu$m, in particular larger than 40 $\mu$m. In addition, 97 wt. % of the particles is smaller than 250 $\mu$m, preferably smaller than 220 $\mu$m, in particular smaller than 205 $\mu$m. In addition, 90 wt. % of the particles is preferably larger than 30 $\mu$m, in particular larger than 50 $\mu$m. The different values preferred for the upper and lower limits can be combined with one another in different manners for products that meet specific economic or technical requirements.

The second product is a granular type of aspartame that has a good bulk density and is easily processable but dissolves less quickly than the first product.

As starting material for the process according to the invention use is preferably made of dry aspartame with a moisture content of less than 6 wt. %, in particular with a moisture content of 1-4 wt. %. The aspartame is usually recovered through crystallisation from an aqueous solution. The slurry finally obtained is filtered off with the aid of for example a centrifuge and the wet cake (containing about 25-60 wt. % water) is dried and optionally granulated. In the granulation step or steps aspartame may be already be formed that has a particle size distribution that makes it suitable for use in the process according to the invention. If, however, a relatively large amount of coarse material is present, for example if more than 20 wt. % has a particle size of more than 1 mm, then it is preferable to grind the material first.

The starting material usually has a wide particle size distribution, which is the result of the mechanical forces exerted during the granulation, reduction and drying steps. As a rule, the aspartame has such a distribution that more than 5 wt. % of the aspartame has a particle size of less than 20 $\mu$m and that more than 10 wt. % has a particle size of more than 400 $\mu$m.

Although it is common to speak of separation at a particular value in the case of for example screening, it is of course true that around that value a portion of the material having a smaller particle size will not pass through the screen and a portion of the larger material will, dependent on the efficiency of the screen. This is because the holes of a screen are not all as large as one another and the particles are not ideally round.

The invention will be elucidated with reference to the following non-limiting examples.

EXAMPLE I

Aspartame obtained through centrifugation, granulation, drying and grinding had the following characteristics:

$d_{10}$: 40 $\mu$m
$d_{50}$: 180 $\mu$m
$d_{90}$: 820 $\mu$m
moisture: 2.8 wt. %

This aspartame was subjected to the following steps:
1) treatment in a Sweco TS 18, using a plate that separates at 50 $\mu$m and a stream of air of 10 kg of air per kg of aspartame. The fine material was returned to the granulation section where it was dispersed in the centrifuged aspartame slurry;
2) the resulting product was passed through a 200-$\mu$m screen. The fraction of the smaller particles was recovered as product 1;
3) the material consisting of the larger particles was passed through a 900-$\mu$m screen. The coarse material was returned to the grinding step; the desired fraction was recovered as product 2.

14% very fine and 5% coarse aspartame were separated. 40% product 1 and 40% product 2 were recovered and there was 1% loss.

The properties of the products are shown in Table 1.

TABLE 1

|  | product 1 | product 2 |
|---|---|---|
| $d_3$ | 32 $\mu$m | 180 $\mu$m |
| $d_{10}$ | 55 $\mu$m | 230 $\mu$m |
| $d_{50}$ | 95 $\mu$m | 400 $\mu$m |
| $d_{90}$ | 180 $\mu$m | 700 $\mu$m |
| $d_{97}$ | 200 $\mu$m | 900 $\mu$m |

Further properties of product 1 were:
settling angle: 24°
bulk density: 410 kg/m$^3$
outflow time*: 9 sec
dissolution rate**: 4 min

*the amount of time was measured that it took for 20 cm$^3$ of product to flow out of a funnel with an outflow aperture with a diameter of 9 mm was measured;
**0.4 g of aspartame in 1 liter of water at 20° C., using a magnetic stirrer and a stirring rod whose diameter was half that of the vessel; 200 rpm in a 2-liter beaker.

Comparative Experiment 1

Aspartame as described in example 1 was passed through a 200-$\mu$m screen. The screen became blocked several times. The cleaning of the screen caused a 5% loss of product. The screened product presented the following properties:

|  | comparative product |
|---|---|
| $d_{10}$ | 20 |
| $d_{50}$ | 70 |
| $d_{90}$ | 160 |
| $d_{99}$ | 200 | settling angle: 34°
bulk density: 385 kg/m$^3$
outflow time: ∞
dissolution rate: 8 min

I claim:
1. Process for the treatment of dried aspartame characterised in that, in a first separation step, particles smaller than 50 $\mu$m are removed, with the aid of a stream of air, from aspartame having a particle size distribution with which more than 5 wt. % of the aspartame has a particle size of less than 20 $\mu$m and more than 10 wt. % of the aspartame has a particle size of more than 400 $\mu$m and that, in a second separation step, the product resulting from the first step is subjected to a screening step using a screen that separates at a value between 150 and 250 $\mu$m, after which the fraction of the smaller particles thus obtained is recovered as a first product and the fraction of the larger particles is recovered as second product or is optionally subjected to a further separation step using a screen that separates at a value between 400 and 1000 $\mu$m, the fraction of smaller particles thus obtained being recovered as second product.

2. Process according to claim 1, characterised in that particles smaller than 30 $\mu$m are removed in the first step.

3. Process according to claim 1, characterised that in the second step use is made of a screen that separates at a value between 180 and 205 $\mu$m.

4. Process according to claim 1, characterised in that a second screening step is carried out using a screen that separates at a value between 900 and 1000 $\mu$m.

* * * * *